United States Patent
Baker et al.

(10) Patent No.: US 9,911,364 B2
(45) Date of Patent: Mar. 6, 2018

(54) RESETTABLE AUTO INJECTOR TRAINING DEVICE WITH A RELEASABLY LOCKING SHIELD AND A RESETTING CAP

(71) Applicants: Jeff Baker, Orlando, FL (US); Hou Shi Shuang, NingBo (CN); Christopher Chung, Orlando, FL (US); Francis Michael Siemer, Orlando, FL (US)

(72) Inventors: Jeff Baker, Orlando, FL (US); Hou Shi Shuang, NingBo (CN); Christopher Chung, Orlando, FL (US); Francis Michael Siemer, Orlando, FL (US)

(73) Assignee: JBCB HOLDINGS, LLC, Orlando, FL (US)

( * ) Notice: Subject to any disclaimer, the term of this patent is extended or adjusted under 35 U.S.C. 154(b) by 133 days.

(21) Appl. No.: 14/847,247

(22) Filed: Sep. 8, 2015

(65) Prior Publication Data
US 2017/0069230 A1    Mar. 9, 2017

(51) Int. Cl.
G09B 23/28    (2006.01)

(52) U.S. Cl.
CPC .................................. G09B 23/285 (2013.01)

(58) Field of Classification Search
USPC ........ 434/262, 267, 268, 272; 604/134, 135, 604/192–196
See application file for complete search history.

(56) References Cited

U.S. PATENT DOCUMENTS

| | | | |
|---|---|---|---|
| 3,426,448 A * | 2/1969 | Sarnoff | G09B 23/285 434/262 |
| 5,071,353 A * | 12/1991 | van der Wal | G09B 23/285 434/262 |
| 5,567,160 A * | 10/1996 | Massino | G09B 23/285 434/262 |
| 7,682,155 B2 * | 3/2010 | Raven | G09B 23/285 434/262 |
| 8,714,984 B2 * | 5/2014 | Mach | G09B 23/285 434/267 |
| 9,336,690 B2 * | 5/2016 | Helmer | G09B 23/28 |
| 9,443,445 B2 * | 9/2016 | Laurusonis | G09B 23/285 |

(Continued)

FOREIGN PATENT DOCUMENTS

EP    2784766 A1    10/2014
KR    10-2012-0107752 A    10/2012

OTHER PUBLICATIONS

PCT/US2016/050827; International Search Report and Written Opinion; dated Jan. 24, 2017, 15 pages.

*Primary Examiner* — Kurt Fernstrom
(74) *Attorney, Agent, or Firm* — Timothy H. Van Dyke; Beusse, Wolter, Sanks & Maire PLLC

(57) ABSTRACT

A resettable injection training device having a an outer shell including a proximal end and a distal end, the outer shell defining a chamber there within, an actuation member near a proximal end, and a plunger slidable within the chamber is provided. The device further including a safety shield having an extended locked position, an extended unlocked position and a retracted position, a locking sleeve configured to interact with the safety shield, and a reset shuttle disposed within the safety shield at a distal end of the device, wherein the reset shuttle is slidable relative to the safety shield, such that movement of the reset shuttle toward the proximal end of the device unlocks the safety shield.

31 Claims, 18 Drawing Sheets

(56) References Cited

U.S. PATENT DOCUMENTS

| | | | | |
|---|---|---|---|---|
| 9,489,868 B2* | 11/2016 | Smith | .................... | G09B 23/28 |
| 2007/0111175 A1 | 5/2007 | Raven et al. | | |
| 2008/0059133 A1* | 3/2008 | Edwards | ................ | G06Q 10/00 |
| | | | | 703/7 |
| 2008/0249477 A1* | 10/2008 | Paproski | ............... | A61M 5/326 |
| | | | | 604/198 |
| 2012/0040320 A1* | 2/2012 | Nadeau | ................ | G09B 23/285 |
| | | | | 434/262 |
| 2013/0236872 A1 | 9/2013 | Laurusonis et al. | | |
| 2015/0037772 A1 | 2/2015 | Julian et al. | | |
| 2015/0235571 A1* | 8/2015 | Alexandersson | . | A61M 5/31501 |
| | | | | 434/262 |

* cited by examiner

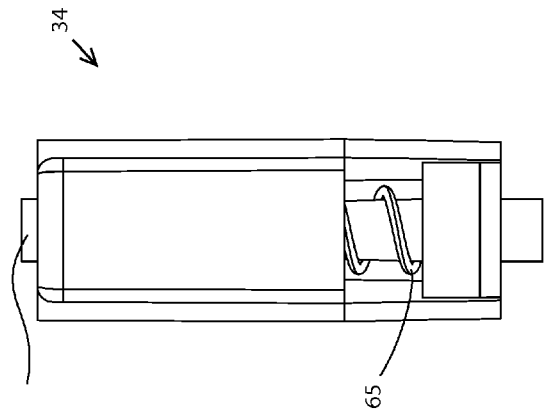
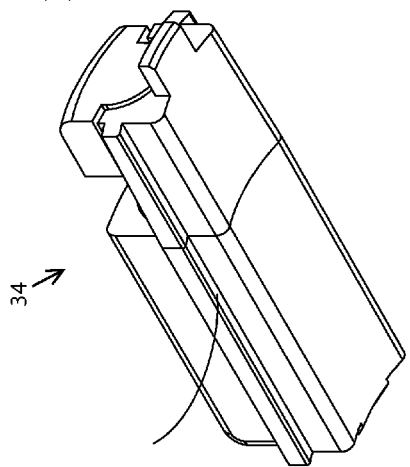
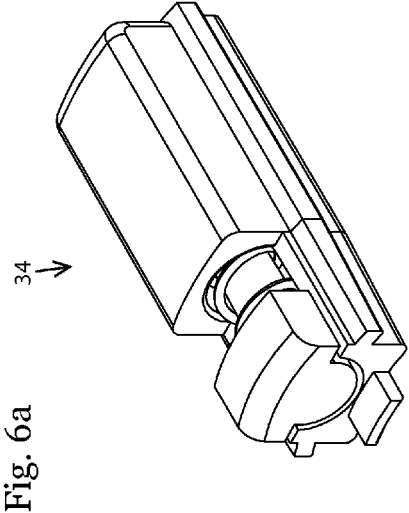
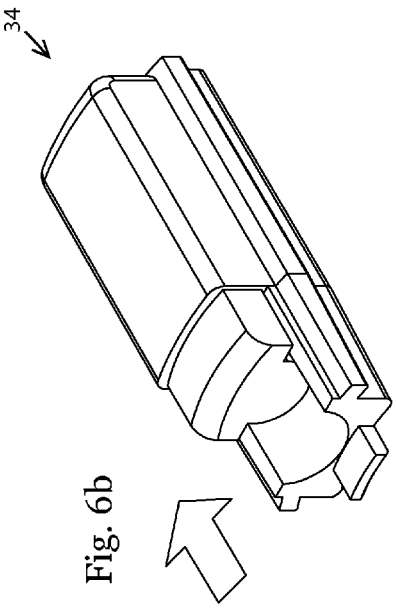

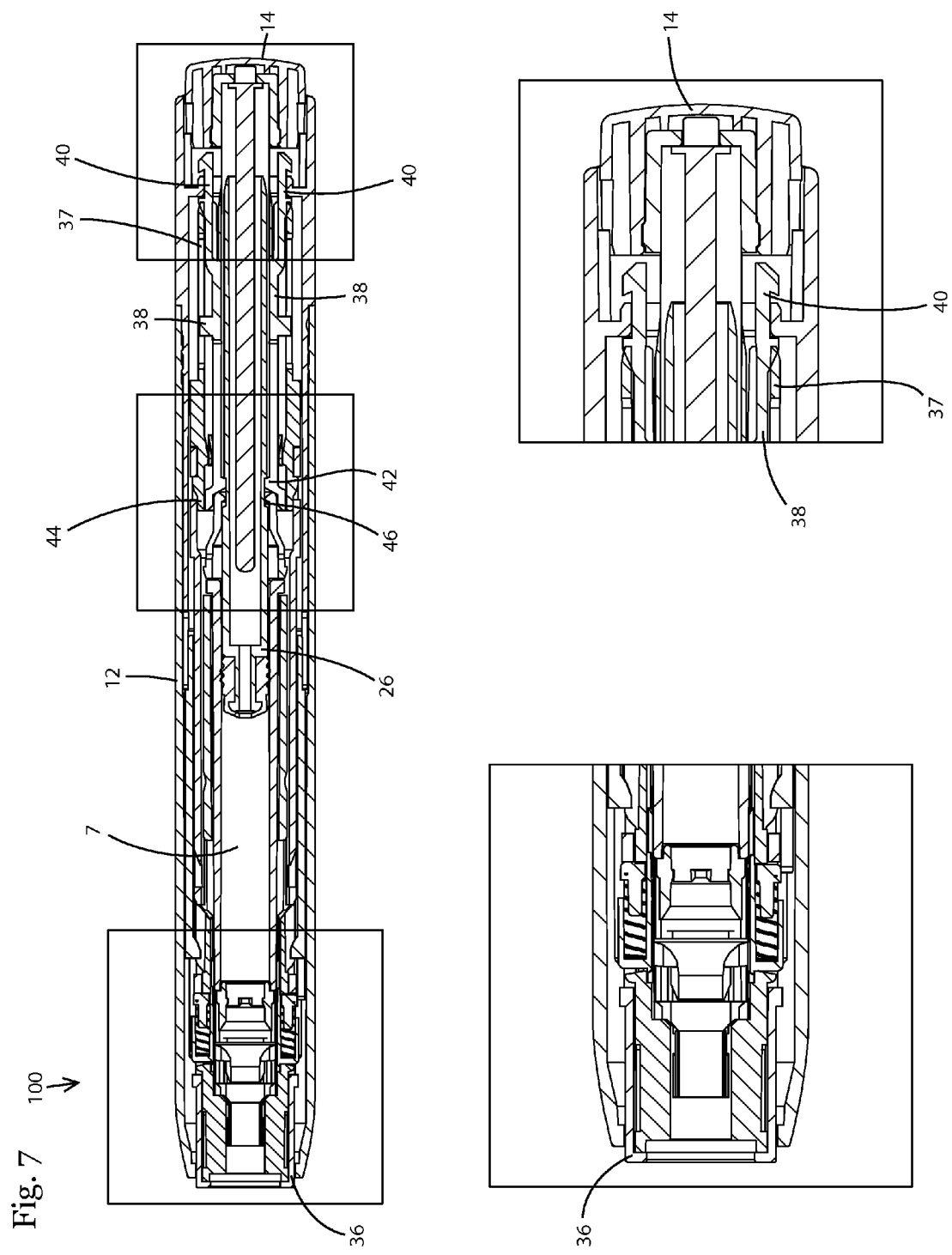

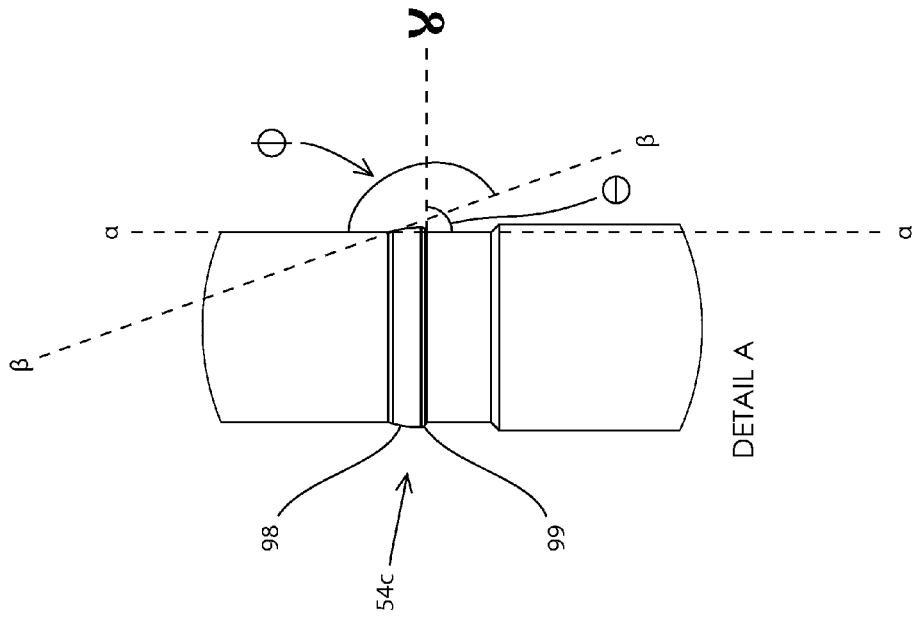
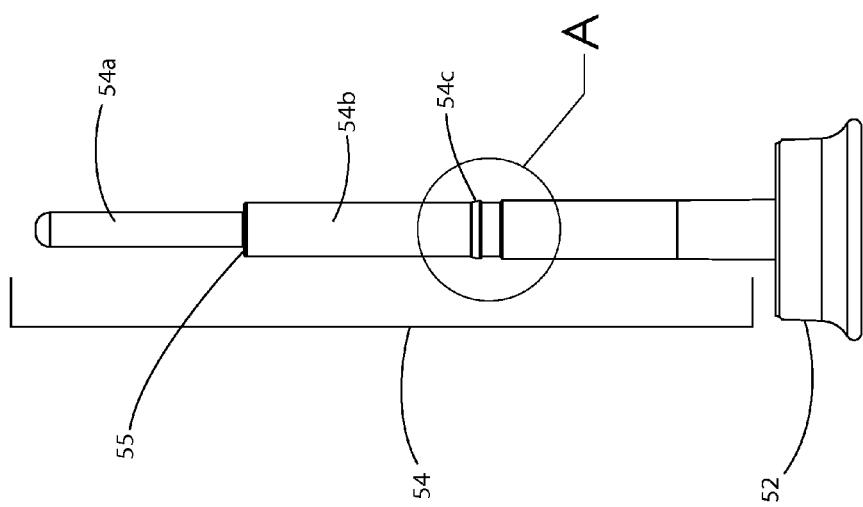
Fig. 10b
Fig. 10a

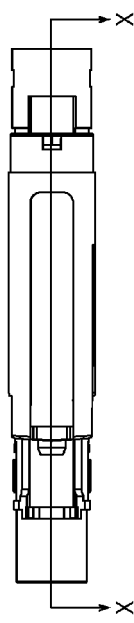
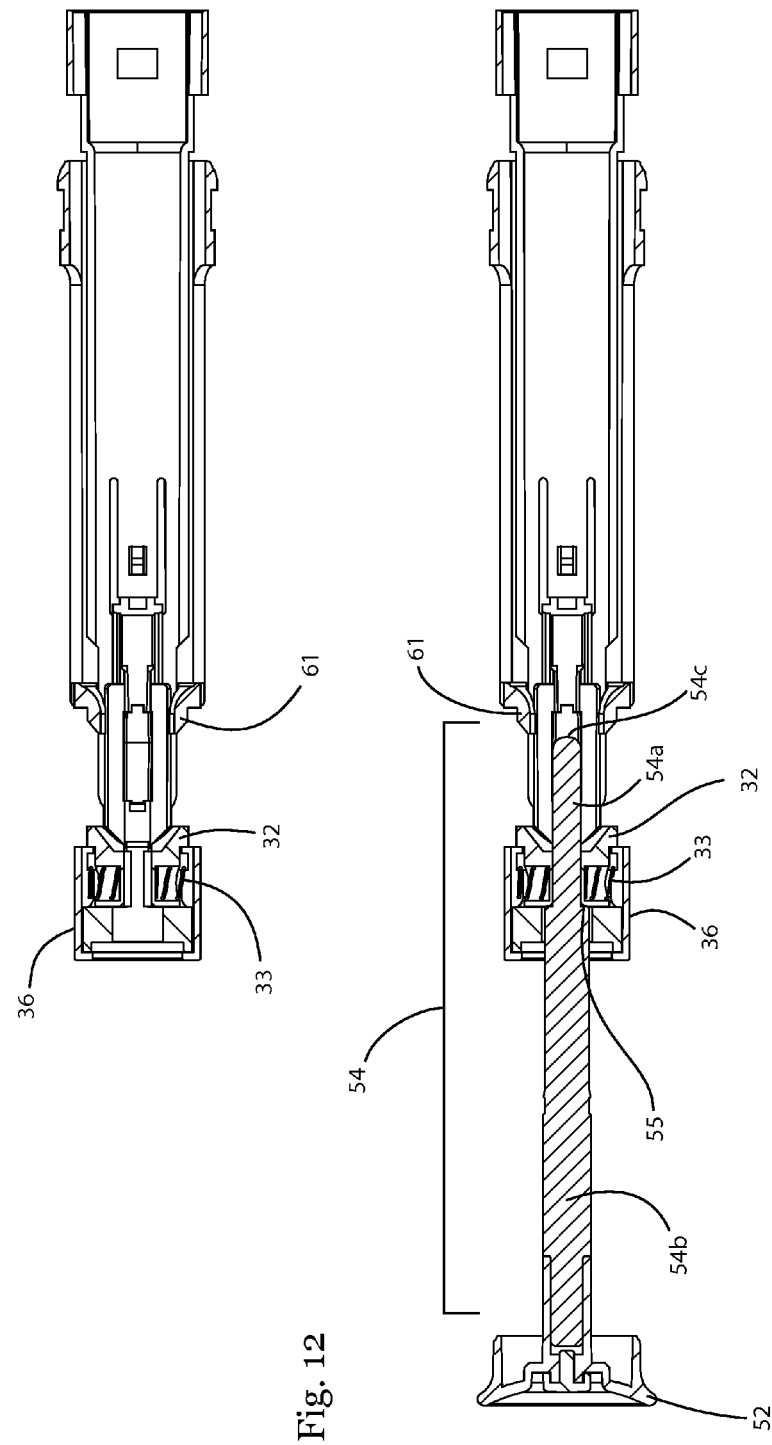
Fig. 11
Fig. 12

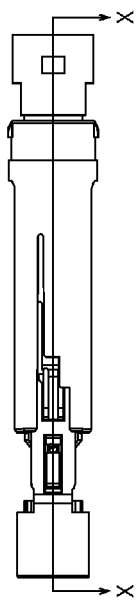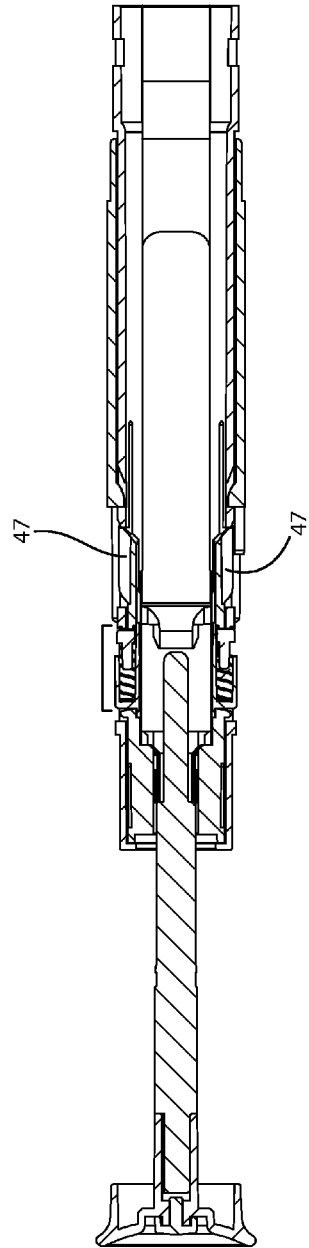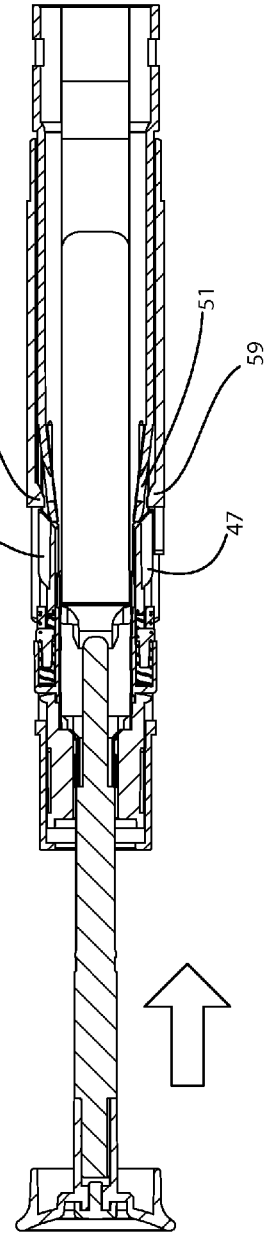
Fig. 13   Fig. 14a

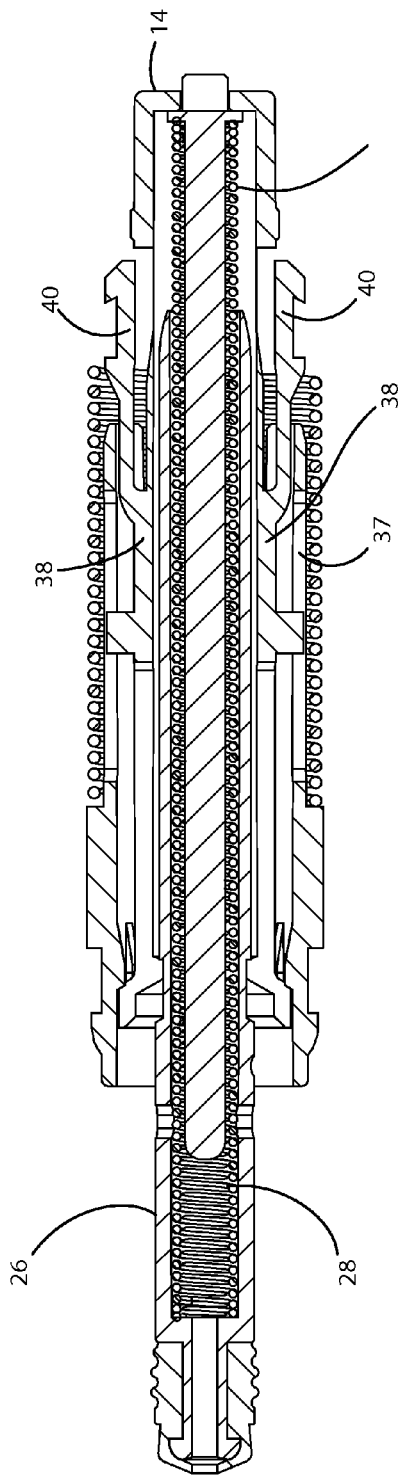
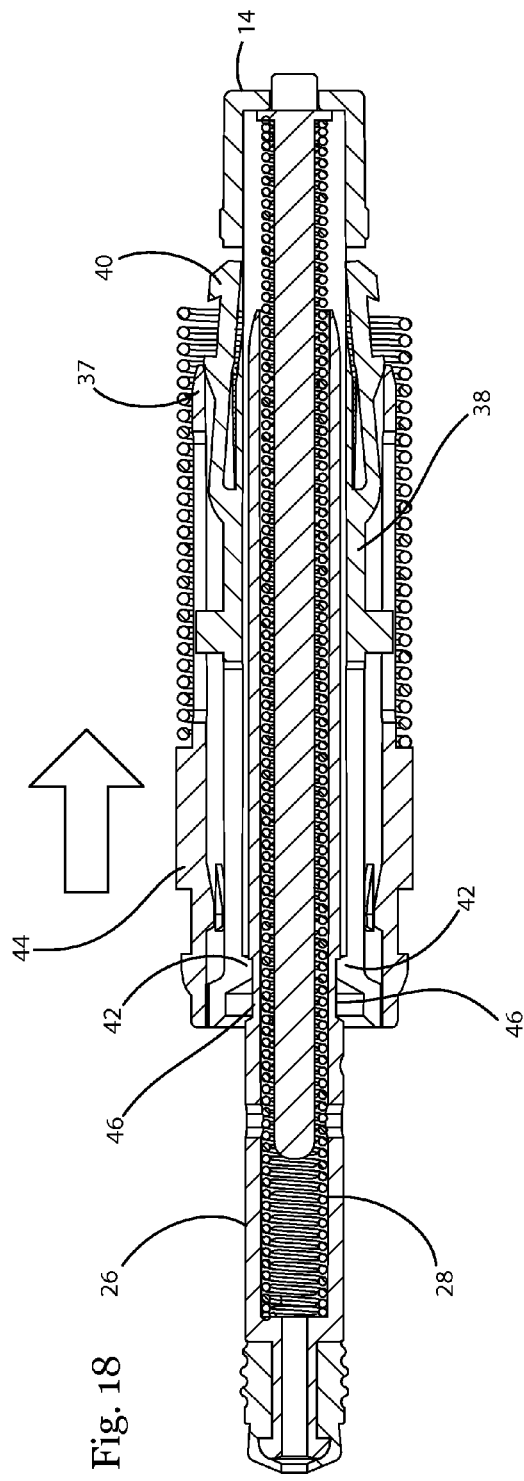
Fig. 17
Fig. 18

RESETTABLE AUTO INJECTOR TRAINING DEVICE WITH A RELEASABLY LOCKING SHIELD AND A RESETTING CAP

BACKGROUND

Injection devices have recently become increasingly popular for single dose or multi-dose, at home self-administration. These devices include both auto-injection devices and pre-filled syringe devices, and are often designed to accomplish two basic objectives: convenience of drug delivery in an outpatient or at home setting, and/or automation of drug delivery in an outpatient or at-home setting.

Injectable medications are required for a number of varying illnesses and diseases. A number of injectable medications require self-injection by a patient. Self-injection of a medicament using a device having a needle carries with it a certain stigma. Oftentimes patients are weary of injecting themselves for fear or anxiety related to failing to receive a complete dose of the medication, pain associated with injecting oneself with the needle, accidentally sticking oneself with the needle, and difficulties in adequately grasping the dosing mechanism to inject oneself, among other concerns. These fears and anxieties associated with the currently available self-injection devices may result in the administration of an incomplete dose of a medicament, failure to administer any portion of the dose of a medicament, or accidentally sticking oneself with the needle of the device, which in some instances could lead to unwanted transmission of diseases if the needle is contaminated.

An additional concern exists with regard to injection devices is that users with little or no medical knowledge or experience are injecting themselves or injecting others using these devices. Performing a medical treatment or test on oneself or others carries with it certain risks and often creates a level of anxiety for the user performing the treatment or test. It has proven beneficial in the medical field to practice various medical techniques including drug delivery, specifically where it relates to injections and other invasive drug delivery means prior to delivering the medications to a patient in need, and particularly in the case of self-administration of medicaments. Training devices are helpful in reducing anxiety associated with self administering medical treatment, as well as increasing efficiency and accuracy in providing the treatment to patients. Medical devices can be intimidating to use; the fear associated with giving oneself an injection, for example, can be traumatic. This fear is increased in persons with little or no experience in self-administration of medications. Consequently, devices to assist in training individuals to inject themselves or otherwise self-administer medication are beneficial in decreasing or preventing the anxiety associated with medicament delivery. Safe use and re-use of these training devices requires a resettable device. Therefore, a device which allows repeated practice and ease of use to enhance familiarity with the injection device and the self-injection process, along with the ability to safely and efficiently reset the device is paramount to an effective device for injection training.

SUMMARY

A resettable injection training device having a an outer shell including a proximal end and a distal end, the outer shell defining a chamber there within, an actuation member near a proximal end, and a plunger slidable within the chamber is provided in an embodiment herein. The device further including a safety shield having an extended locked position, an extended unlocked position and a retracted position, a locking sleeve configured to interact with the safety shield, and a reset shuttle disposed within the safety shield at a distal end of the device, wherein the reset shuttle is slidable relative to the safety shield, such that movement of the reset shuttle toward the proximal end of the device unlocks the safety shield.

In another embodiment, a resettable injection training device includes an outer shell having a proximal end and a distal end, the outer shell defining a chamber there within, an actuation member near a proximal end, and a plunger slidable within the chamber, a safety shield having an extended locked position, an extended unlocked position and a retracted position, the safety shield comprising a safety shield locking tab, said tab comprising a locking tab opening, a locking sleeve configured to surround the safety shield, said locking sleeve including one or more protrusions configured to interact with the locking tab opening when the safety shield is in an extended locked position, a reset shuttle disposed within the safety shield at a distal end of the device, wherein the reset shuttle is slidable relative to the safety shield, such that movement of the reset shuttle toward the proximal end of the device unlocks the safety shield, a cap comprising a cap end and an elongate rod comprising an interfacing surface, wherein contact between the interfacing surface of the elongate rod and the reset shuttle slides the reset shuttle relative to the safety shield to unlock the safety shield.

In still another embodiment, a method for resetting an injection training device having an outer shell defining a chamber, the device including an actuation assembly outer housing and an actuation assembly inner housing slidable relative to one another, the actuation assembly inner housing comprising one or more flexible prongs at a proximal end of the device configured to lock an actuation mechanism, a plunger slidable within the chamber, a locking safety shield movable between an extended position and a retracted position, a locking sleeve configured to interact with the safety shield, a reset shuttle disposed within a distal end of the safety shield and slidable relative there to, and a cap comprising an elongate rod for resetting the device, wherein when the safety shield is in an extended locked position, wherein insertion of the elongate rod into the chamber slides the reset shuttle relative to the safety shield, unlocking the safety shield for a subsequent use.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIGS. 6A-B are perspective views of a guiding pillar.

FIG. 6C is a top view of a guiding pillar.

FIG. 6D is a perspective view of a guiding pillar.

FIG. 7 is a cross sectional view of an embodiment of a resettable injection training device with a depressed shield.

FIG. 10A-B is a side view of a cap according to an embodiment of the invention, and a sectional view of an elongate rod portion of the cap of FIG. 10A, respectively.

FIG. 11 is a sectional cross sectional view of the embodiment of FIG. 7 in an actuated position with a locked shield.

FIG. 12 is a sectional cross sectional view of the embodiment of FIG. 11 with a cap in a first reset position.

FIG. 13 is a sectional cross sectional view of the embodiment of FIG. 11 with a cap in a first reset position, wherein the device is rotated 90 degrees from the view in FIG. 12.

FIG. 14A is a sectional cross sectional view of the embodiment of FIG. 13 with a cap in a second reset position.

FIG. 17 is a cross sectional view of a portion of the embodiment of FIG. 16 with the plunger in a fully reset position.

FIG. 18 is a cut-away cross sectional view of a portion of the embodiment of FIG. 17 with an outer housing in a reset position.

DETAILED DESCRIPTION

Figure 1:
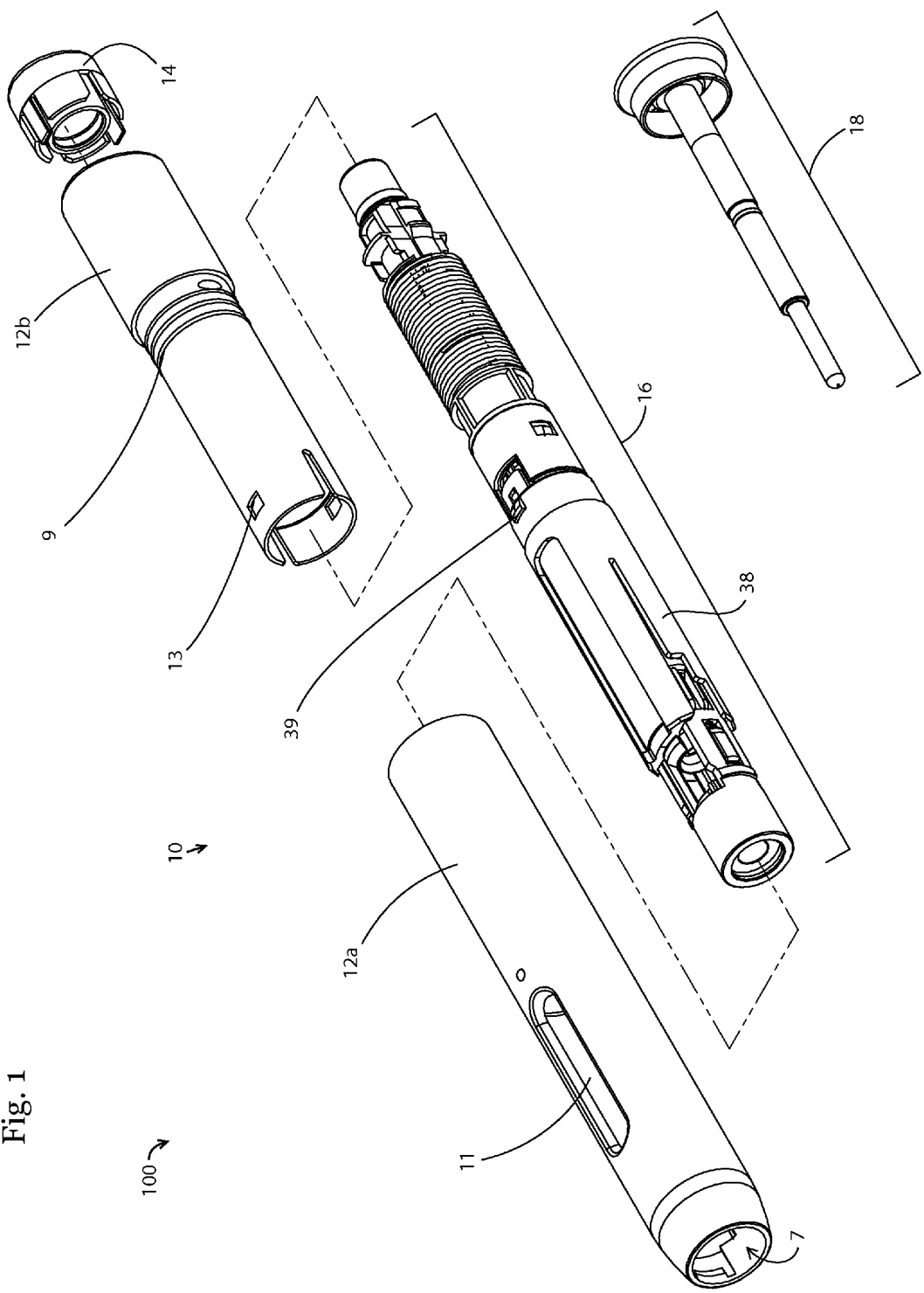
FIG. 1 is an exploded view of components of an embodiment of a resettable injection training device.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

As used herein, the singular forms "a," "an," and "the" are intended to include the plural forms as well, unless the context clearly indicates otherwise these terms do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising."

Moreover, unless specifically stated, any use of the terms first, second, etc., does not denote any order, quantity or importance, but rather the terms first, second, etc., are used to distinguish one element from another. The modifier "about" used in connection with a quantity is inclusive of the stated value and has the meaning dictated by the context. It is to be noted that all ranges disclosed within this specification are inclusive and are independently combinable.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. As a non-limiting example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 7. As another non-limiting example, a range of "between 20 and 10" can also include the values 20, 10.

The term "adjacent" as used herein, includes but is not limited to near, associated with, or in close proximity to.

In embodiments herein, an actuation member is described as being in a locked and an unlocked position. In its locked position, the actuation member may still be movable and compressible; however compression of the actuation member will not affect actuation of the device. In the unlocked position, the actuation member may be compressed to actuate the device. Therefore, when the actuation member is in the unlocked position, activation of the actuation member may actuate the device.

The inventors herein have identified a need for a device to be used in effectively training patients to use a needle-containing injection device, particularly when these injection devices are used for at home or outpatient environments. In the field of medicament injection training devices, correct injection of medicament by way of the injection device is crucial for obtaining accurate doses of medicament contained therein. Factors such as a fear of needles, fear of pain associated with an injection, inexperience with injection devices and delivering injections, and unfamiliarity with injection devices and their operation, among other factors can contribute to issues in administering the medicament correctly with the injection device. Consequently, patient training in correct operation of the injection device is crucial to reducing patient anxiety and enhancing patient compliance. In one embodiment, a resettable injection training device is provided herein.

Turning to the Figures, FIG. 1 is an exploded view of components of an embodiment 100 of a resettable injection training device 10 including an outer shell 12 having a lower outer shell portion 12a, an upper outer shell portion 12b, and an actuation member 14 configured to associate at a proximal end of the outer shell 12. The outer shell 12 defines a chamber 7. FIG. 1 shows a perspective view of an internal mechanical assembly 16 of the device 10, and a cap 18. In FIG. 1, a locking sleeve interacting tab 39 can be found on a locking sleeve 38 of the internal mechanical assembly 16. The locking sleeve interacting tab 39 is configured to interact with a locking sleeve interacting slot 13 on the outer shell 12, such that when the locking sleeve interacting tab 39 is engaged within the locking sleeve interacting slot 13, the locking sleeve 38 is stationary relative to the upper outer shell 12b. A viewing window 11 is shown in the lower outer shell portion 12a allowing a user to view into and/or through the device 10.

Further shown in FIG. 1 are upper outer shell interacting ribs 9 of the upper outer shell 12b, which are configured to interact with an inner surface of the lower outer shell 12a, to affix upper outer shell 12b to lower outer shell 12a, in a non-limiting embodiment, when the device embodiment 100 is assembled. The upper outer shell and lower outer shell 12b, 12a, respectively, may alternatively be affixed to one another in a variety of ways, including but not limited to a friction fit interaction between the two components, a tab and opening interaction between the two components, wherein a tab on either the upper or lower outer shell interacts with a tab on the other of the upper or lower shell, or joined by another method such as ultrasonic welding, an adhesive, or any other such method known to those skilled in the art.

Figure 2:
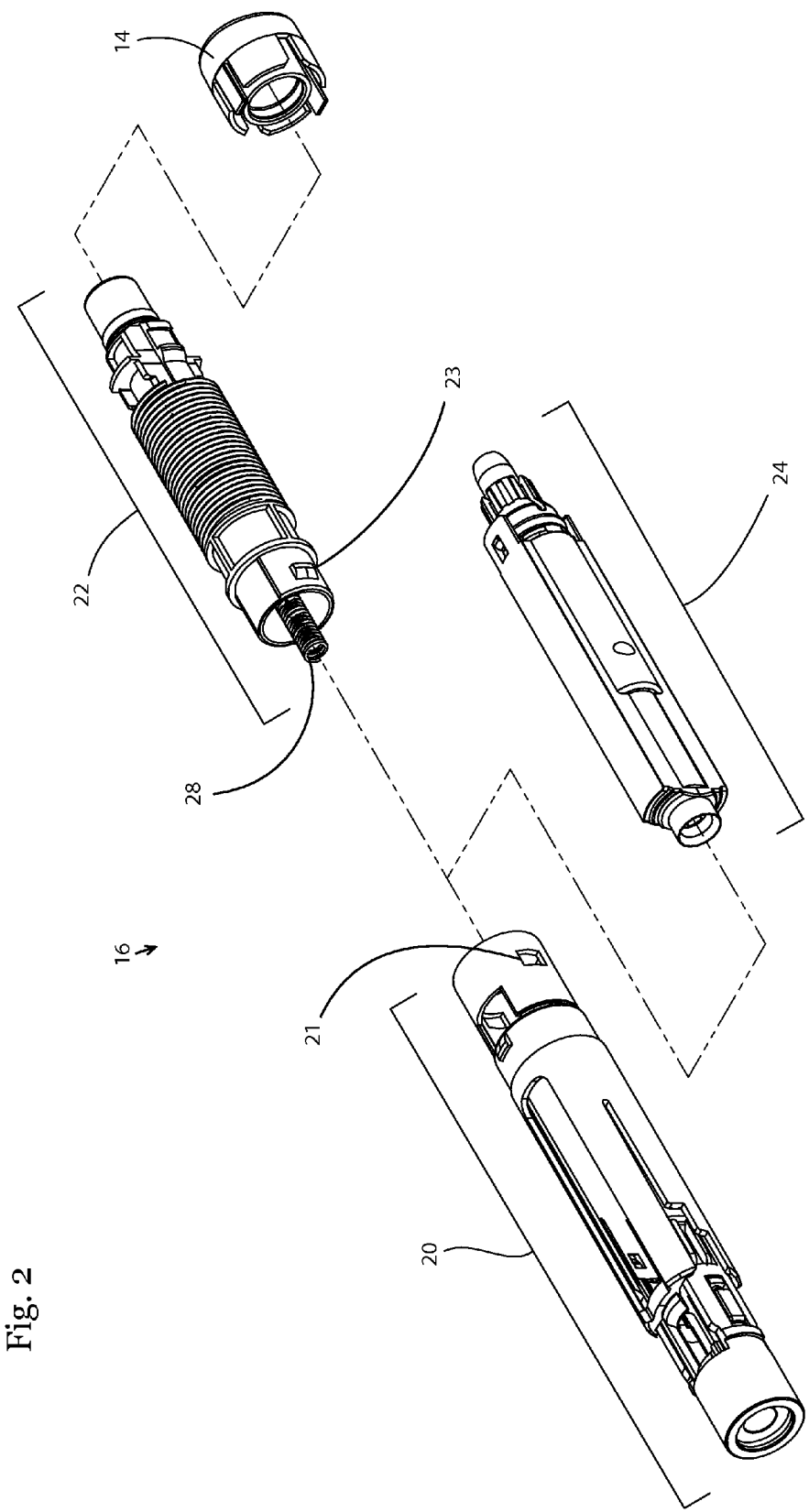
FIG. 2 is an exploded view of an internal mechanical assembly embodiment of the resettable injection training device of FIG. 1.

FIG. 2 is an exploded view of the internal mechanical assembly 16 including a safety shield reset assembly 20 having a safety shield interaction opening 21, a plunger actuator mechanism assembly 22 with a plunger spring 28 and a safety shield interaction tab 23 configured to interact with the safety shield interaction opening 21 when the internal mechanical assembly 16 is assembled. The internal mechanical assembly 16 further includes a medication simulator window assembly 24 and the actuation member 14 (previously shown in FIG. 1).

Figure 3:
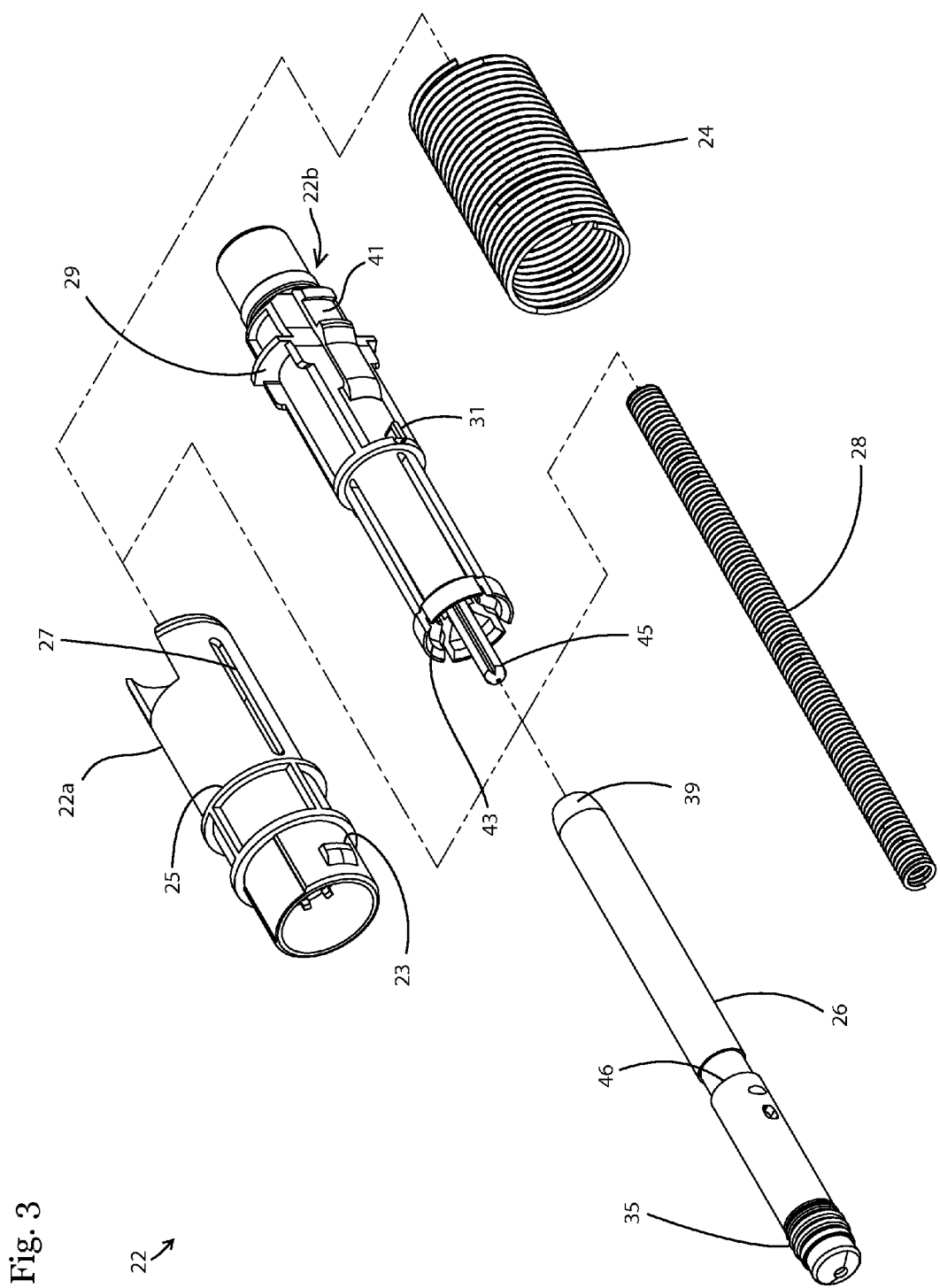
FIG. 3 is an exploded view of the plunger actuator mechanism assembly of the embodiment of the resettable injection training device of FIG. 1.

FIG. 3 is an exploded view of the plunger actuator mechanical assembly 22, showing a lower plunger actuator mechanical assembly portion 22a having a plunger reset spring proximal stop portion 25 and the safety shield interlocking tab 23 shown in FIG. 2. The lower plunger actuator mechanical assembly portion 22a may further include a rotation-limiting slot 27. The plunger actuator mechanical assembly may further include an upper plunger actuator mechanical assembly portion 22b, including a plunger reset spring distal stop anti-rotational limiting tab 29 and a rotation limiting tab 31 for engaging with the rotation limiting slot 27 to prevent rotation of the lower plunger actuator mechanical assembly portion 22a relative to the upper plunger actuator mechanical assembly portion 22b when the components are assembled together. The upper plunger actuator mechanical assembly portion 22b further includes an actuation unlocking tab 41, plunger locking teeth 43, and a plunger spring guide 45 for associating with a plunger spring 28. A plunger reset spring 24 is configured to be disposed between the plunger reset spring proximal and distal stops 25, 29, respectively. A plunger 26 having a proximal end 39 and a distal end 35 and a plunger reset groove 46.

Figure 4:
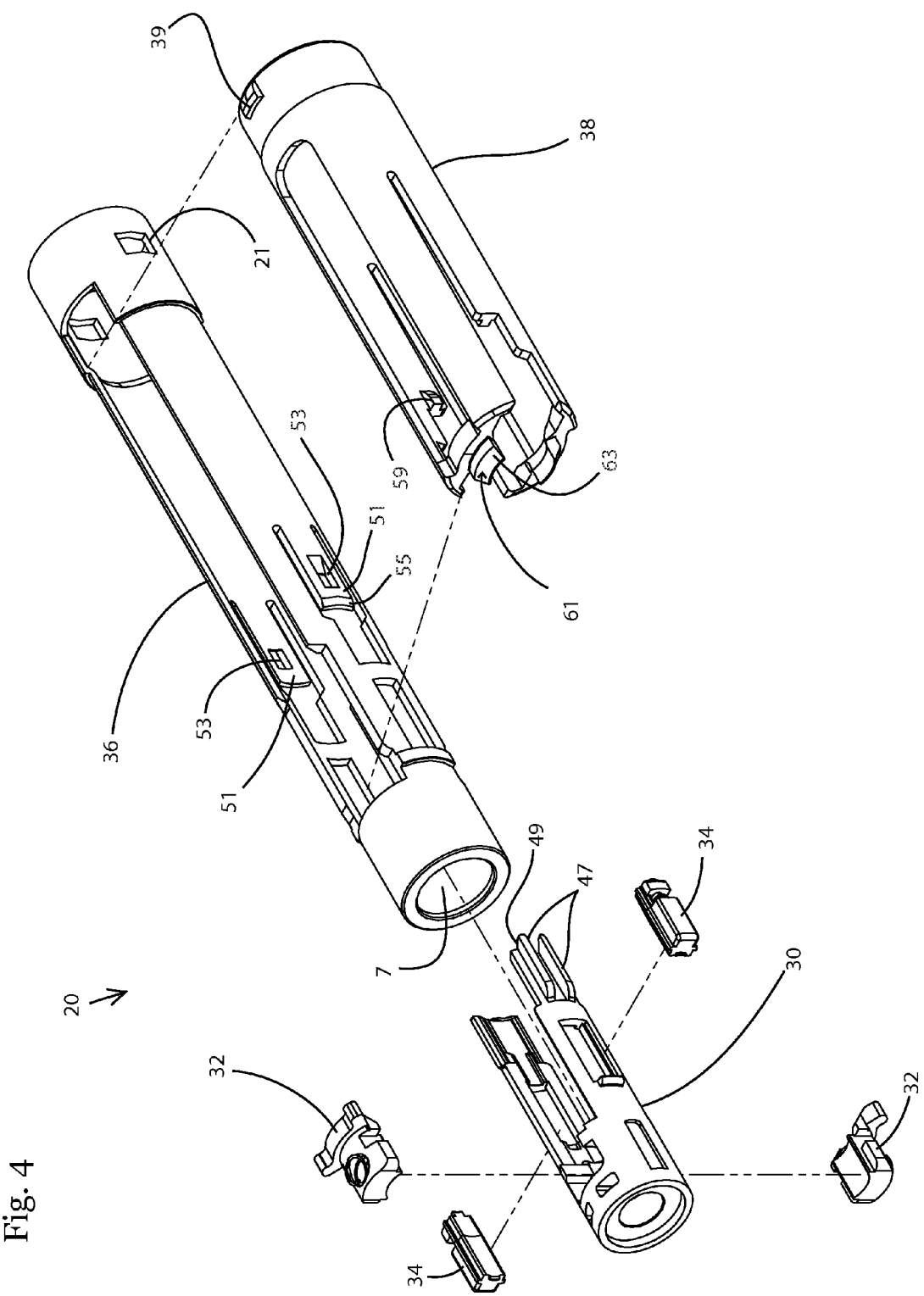
FIG. 4 is an exploded view of a safety shield reset assembly of the embodiment of the resettable injection training device of FIG. 3.

FIG. 4 is an exploded view of the safety shield reset assembly 20 having an unlock shuttle 30, including sliding blocks 32, guiding pillars 34, safety shield 36, and a locking sleeve 38. The reset shuttle 30 includes at least one reset tooth 47, each reset tooth having a tab interfacing surface 49, the reset shuttle 30 is configured to move relative to the safety shield 36, wherein when the reset shuttle moves in a proximal direction relative to the device and relative to the safety shield 36 to unlock and reset the device. The safety shield 36 further defines the chamber 7, and includes a safety shield locking tab 51 having a locking tab opening 53 and a tooth interfacing surface 55. The safety shield 36 further includes a safety shield interaction opening 21 for receiving the safety shield interaction tab 23 on the plunger actuator mechanism assembly 22 (see FIG. 2). The locking sleeve 38 includes a locking sleeve interacting tab 39 for interacting with the locking sleeve interacting slot 13 of the outer shell 12, such that the locking sleeve 38 may be secured to the outer shell 12 to prevent movement there between. The locking sleeve 38 also includes a safety lock protrusion 59 for interacting with the locking tab opening 53 on the safety shield 36 when the safety shield is in an extended locked position to prevent sliding of the safety shield 36 relative to the outer shell 12. Interaction between the reset tooth (or teeth) 47 and the safety shield locking tab 51 as the reset shuttle 30 is moved in a proximal direction relative to the safety shield 36, causes the safety shield locking tab 51 to bias inward, to release the safety lock protrusion 59 from the locking tab opening 53 to allow the safety shield to be reset from an extended locked position to an unlocked position. Locking sleeve further includes a sliding block rib 61 for interaction with the sliding block 32 (shown in FIGS. 5a-5b) during reset of the device.

Figure 5B:
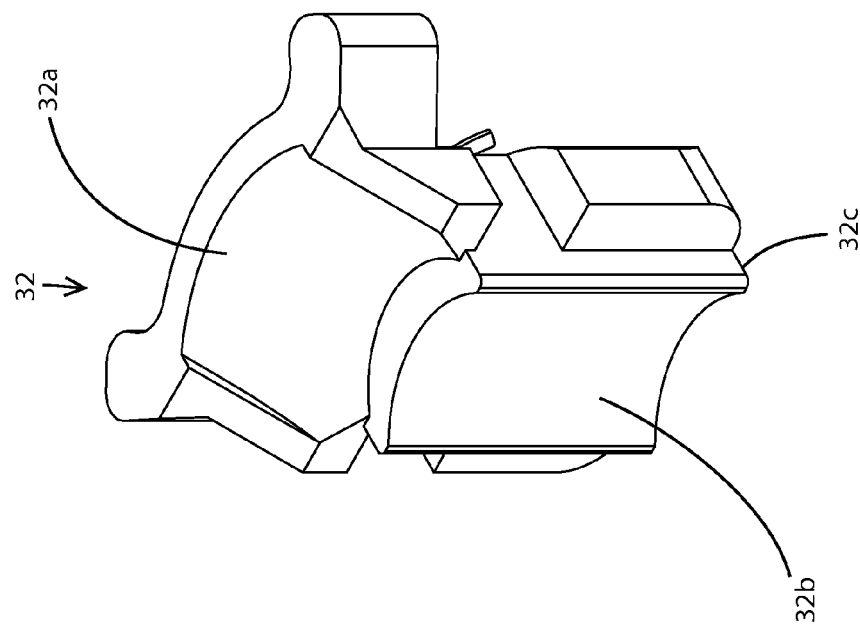
FIG. 5A-5B are perspective views of a sliding block.
Figure 5A:
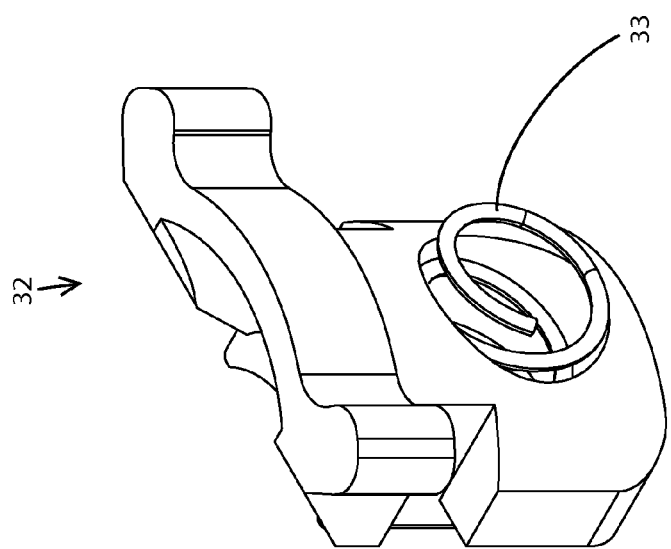

FIG. 5A-5B are perspective views of a sliding block 32 including sliding block spring 33. Sliding block 32 includes a rib interfacing surface 32a configured to interface with a block gliding rib 50 of the device (block gliding rib shown in FIG. 10), and a rod first portion interfacing surface 32b configured to interface with a first portion of the cap 18 during reset of the device 10, as well as a rod interfacing surface 32c configured to interface with an elongate member shoulder of the cap 18 (as described below) during movement of the sliding block 32 in a proximal direction to reset the device 10. An interaction between the angled surfaces of the rib interfacing surface 32a and the sliding block interfacing surface 63 of the sliding block rib 61 during reset of the device 10 causes the sliding block to move outward toward the outer shell 12 to allow passage of the elongate rod of the cap through the chamber 7 to reset the device 10. The angled surfaces are complementary to one another to allow movement of the sliding block 32 in a proximal direction and outward toward the periphery of the device 10 toward the outer shell 12.

FIGS. 6A-D are views of a guiding pillar 34 having a guide spring 65 associated with a spring rod 67. FIGS. 6A, 6C, and 6D show the guiding pillar in an extended position. FIGS. 6A and 6C show the guide spring 35 of the guiding pillar 34. In FIG. 6B the guiding pillar 34 is shown in a compressed position, with guide spring 35 compressed. The guiding pillar 34 prevents jamming of the device 10 during reset and use of the device 10.

FIG. 7 is a cross sectional view of the embodiment 100 of the resettable injection training device 10 showing a first step in actuation of the device 10 in one embodiment. In FIG. 7, the safety shield 36 is retracted (which can occur by applying a force onto the distal end of the safety shield), a step required in order to unlock the actuation member 14 to allow actuation of the device 10. Retraction of the safety shield 36 causes the outer housing 37 to move in a proximal direction relative to the inner housing 38, such that flexible prongs 40 at a proximal end of the inner housing 38 are biased inward, allowing the actuation member 14 to be unlocked and allowing actuation of the device 10 upon movement of the actuation member 14 in a distal direction following an application of force on the actuation member 14. Chamber 7 is shown, and plunger 26 is slidable within the chamber 7. Firing fingers 42 are shown medial to a collar 44 of the outer housing 37. The plunger 26 includes a plunger groove 46, wherein the firing fingers 42 are interfacing with the plunger groove 46 in FIG. 7, prior to actuation of the device 10 via actuation member 14. In FIG. 7, the shield 36 is in a depressed position, retracted within the outer shell 12 of the device 10, as aforementioned. By unlocking actuation member 14, the actuation member 14 is in an actuatable, compressible position, no longer blocked by the prongs 40.

Figure 8:
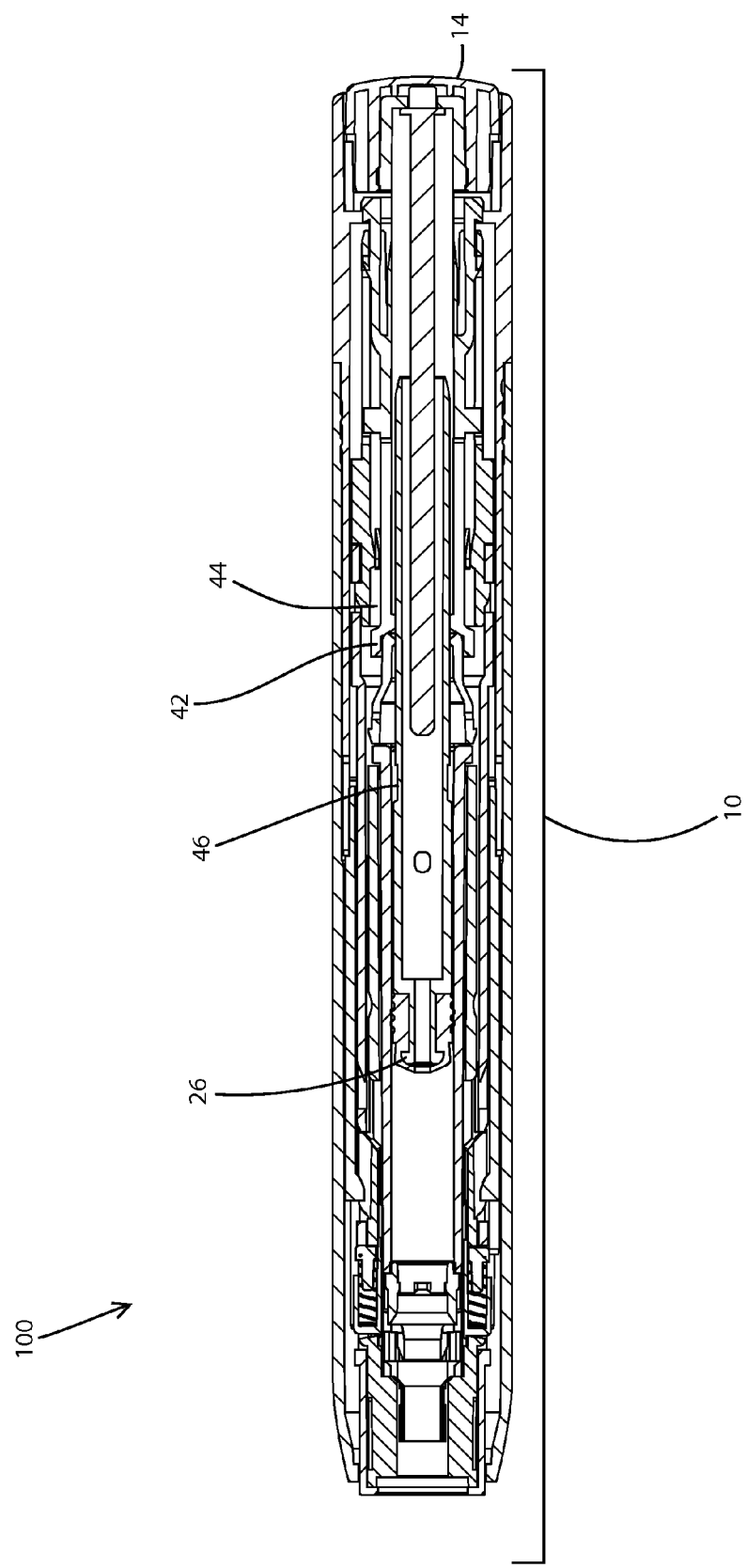
FIG. 8 is a cross sectional view of the embodiment of FIG. 7 in an actuated position.

FIG. 8 shows the embodiment 100 of device 10 shown in FIG. 7, in an actuated position, demonstrating the second step in actuation of the device 10, by moving actuation member 14 toward the proximal end of device 10 to actuate the device 10. Actuation of the actuation member 14 in this manner causes the firing fingers 42 to move past collar 44, allowing them to be released from plunger groove 46 such that plunger groove 46 may traverse the firing fingers 42 as the movement of the actuation member 14 advances the plunger 26 in a distal direction relative to the device 10.

Figure 9:
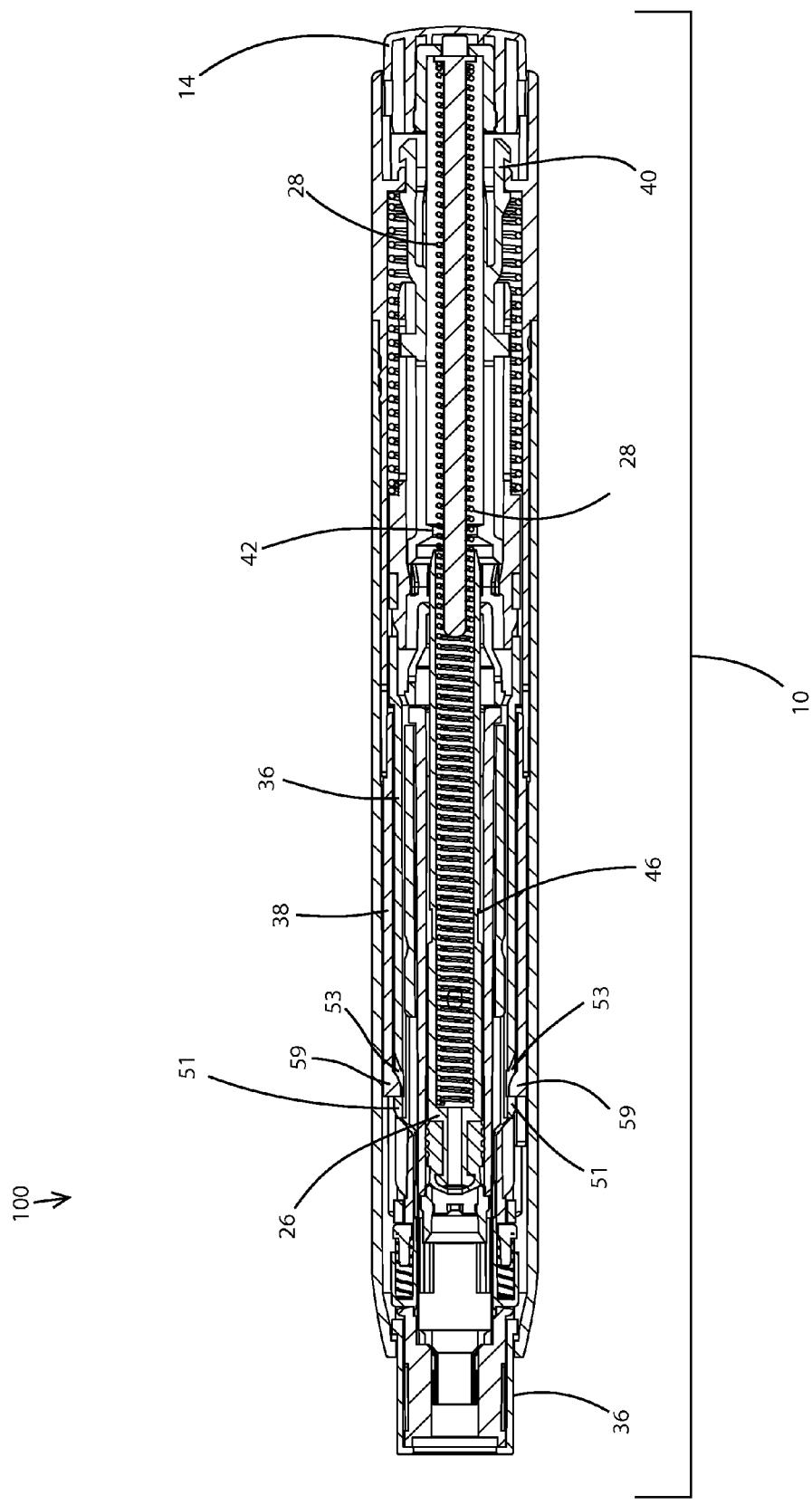
FIG. 9 is a cross sectional view of the embodiment of FIG. 8 in an actuated position with a locked shield.

FIG. 9 is a cross sectional view of the embodiment 100 of the device 10 of FIG. 8 in a post actuation position with the shield 36 in an extended, releasably locked position following actuation. The plunger 26 is at the distal end of the device 10, the outer housing 37 has moved in a proximal direction relative to the inner housing 38, and the prongs 40 are released, locking and preventing actuation of the actuation member 14. The safety lock protrusions 59 of the locking sleeve 38 are each shown as interacting with the locking tab openings 53 of the safety shield locking tabs 51 of the safety shield 36 to maintain the safety shield 36 in an extended, locked position. The plunger spring 28 is shown in an extended position, and the firing fingers 42 are not associated with the plunger groove 46.

FIG. 10A-B provide a side view and a sectional view of the cap 18 having an elongate rod 54. In some embodiments, the elongate rod 54 comprises a configuration that allows for a different frictional force upon insertion of the rod into the device as compared to removal of the rod from the device. The frictional force may be caused by an interaction between an outer surface of the elongate rod 54 and an inner surface of the device upon movement of the elongate rod 54 relative to the device, within the chamber. In one non-limiting embodiment, the frictional force may be caused by the interaction of the elongate rod with an inner wall of the chamber. In another non-limiting embodiment the frictional force may be caused by an interaction between a non-uniform feature 54c on the elongate rod (described below) and an inner surface of the device defining the chamber. In some non-limiting embodiments a different frictional force includes a greater force to remove the rod from the device than to insert the rod into the device. In other non-limiting embodiments, the different frictional force may include a greater force to insert the rod into the device than to remove the rod from the device. In a non-limiting embodiment, the elongate rod 54 includes a non-uniform feature 54c, shown in FIGS. 10A, 10B. In the non-limiting embodiment of FIG. 10A, the cap 18 is shown having an elongate rod 54, with a first diameter portion 54a, a second diameter portion 54b, and an optional third diameter portion 54d. A non-uniform feature 54c is shown along the elongate rod 54. The cap 18 includes a cap end 52, and an elongate member shoulder 55 at an intersection between the first diameter 54a and the second diameter 54b, in a non-limiting embodiment. In some non-limiting embodiments, an end portion 54d of the elongate rod 54 may include an arcuate shaped end, to facilitate the movement of the end portion 54d into the chamber 7.

The non-uniform feature 54c is shown in greater detail in FIG. 10B, wherein it includes an asymmetric angled portion, in an embodiment as shown. The asymmetric angled feature may be included such that an insertion force of inserting the elongate rod portion into the device during reset is less than a removal force, the force required to remove the elongate rod portion from the device. The non-uniform feature 54c comprising a first surface 98 and a second surface 99. A first angle phi ($\Phi$) is formed between the longitudinal axis of the elongate rod alpha ($\alpha$) and a longitudinal axis of the first surface beta ($\beta$), and a second angle theta ($\theta$) is formed between the longitudinal axis of the elongate rod $\alpha$ and a longitudinal axis of the second surface gamma ($\gamma$) so as to provide the different directional force, such that the removal force required to remove the elongate rod from the device is greater than an insertion force required to insert the elongate rod into the device, in one, non-limiting example. In one non-limiting example, the first angle $\Phi$ may include an angle less than 180 degrees. In another non-limiting example, the second angle $\theta$ may include an angle of less than 180 degrees and less than the first angle $\Phi$. The diameter of the cap end 52 may include between 15-25 mm. In non-limiting embodiments, the first diameter of the elongate rod may include a diameter of between 0.25-9.9 millimeters, and the second diameter may include a diameter of between 3-10 mm. In another non-limiting embodiment, the difference between the diameters of the first and second diameters may be 0.1-4.0 mm.

In FIG. 11, the distal end of the device 10 is shown with the outer shell 12 and other outer layers removed from the device. The safety shield 36 is in an extended, locked position, sliding blocks 32 are shown as biased inward via the sliding block spring 33 on each sliding block 32, and the sliding block rib 61 is shown.

In FIGS. 12 and 13, a first step in the reset of the device 10 is shown. The cap 18 having a cap end 52, and an elongate rod 54 is provided, and is inserted into the distal end of the device 10 as shown, such that the first diameter 54a of the elongate rod 54 is within the distal end of the device, and is in contact with the first diameter interfacing surface 32b of the sliding blocks 32. The elongate rod 54 includes dimensions allowing it to be receivable within the chamber 13 of the device 10. The cap 18 is slidably engageable relative to the device 10 and can be used to reset the device 10 after actuated, to prepare the device 10 for a subsequent use. In a non-limiting embodiment, the diameter of the cap end 52 may be generally equal to the diameter of the device 10. The cap 18 can be used to release the shield 20 from an extended locked position to an unlocked position, as well as reset the plunger 26 to a pre-actuated position, in addition to reset the actuation mechanism from a locked position to an unlocked position in preparation for a subsequent use of the device 10. As shown in FIG. 12, reset of the device 10 begins with insertion of the elongate rod 54 of the cap 18 into the distal end of the chamber 7. Insertion of the first portion 54a slightly spreads the sliding blocks 32 apart due to the dimensions of the first portion 54a until the shoulder 55 interfaces with the sliding blocks. FIG. 13 is a view of FIG. 12, wherein the device 10 is rotated 90 degrees such that the sliding blocks 32 can be viewed from a different angle.

Figure 14B:
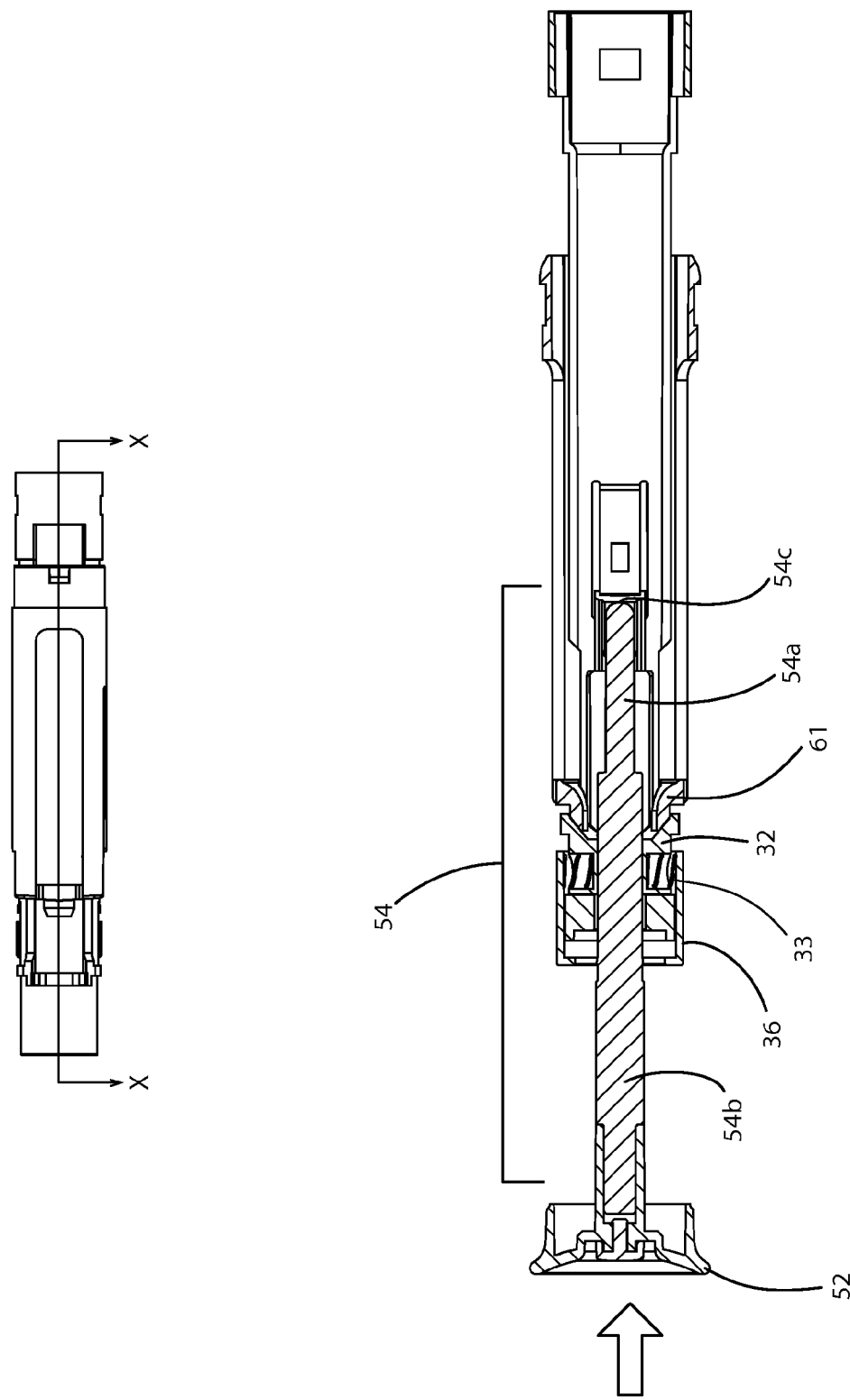
FIG. 14B is a sectional cross sectional view of an embodiment of the device with a cap in a third reset position.

Movement of the cap 18 further toward the proximal end of the device 10 as shown in FIG. 14, causes the shoulder 55 of the elongate rod 54 to move the sliding blocks 32 toward the proximal end of the device 10, wherein further movement of the sliding blocks 32 in this direction allows the sliding blocks 32 to contact the guiding block ribs 61. As a result of the angles of the interfacing surfaces of the sliding blocks 32 and the guiding block ribs 61, via the elongate rod 54 7, and allows the reset shuttle 30 to move in a proximal direction, until the reset tooth 47 interacts with the safety shield locking tab 51, to bias the tab inward as shown in FIG. 14, and release the safety lock interface protrusion 59 from the safety shield locking tab 51 to allow the safety shield 36 to be unlocked and reset. Once the shoulder 55 of the elongate rod 54 passes the sliding blocks 32, the second diameter 54*b* can enter further into the chamber 13 in a proximal direction until the end portion 54*c* contacts the plunger 26. Further movement of the cap 18 in the proximal direction compresses the plunger spring 28 to reset the plunger 26.

Figure 15:
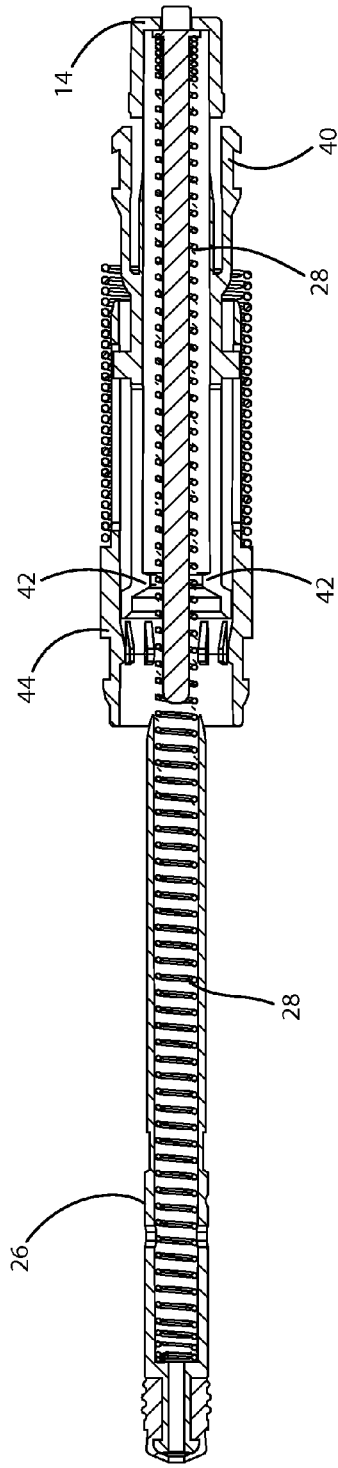
FIG. 15 is a cross sectional view of a portion of an embodiment of the device with a plunger in a fully extended position.
Figure 16:
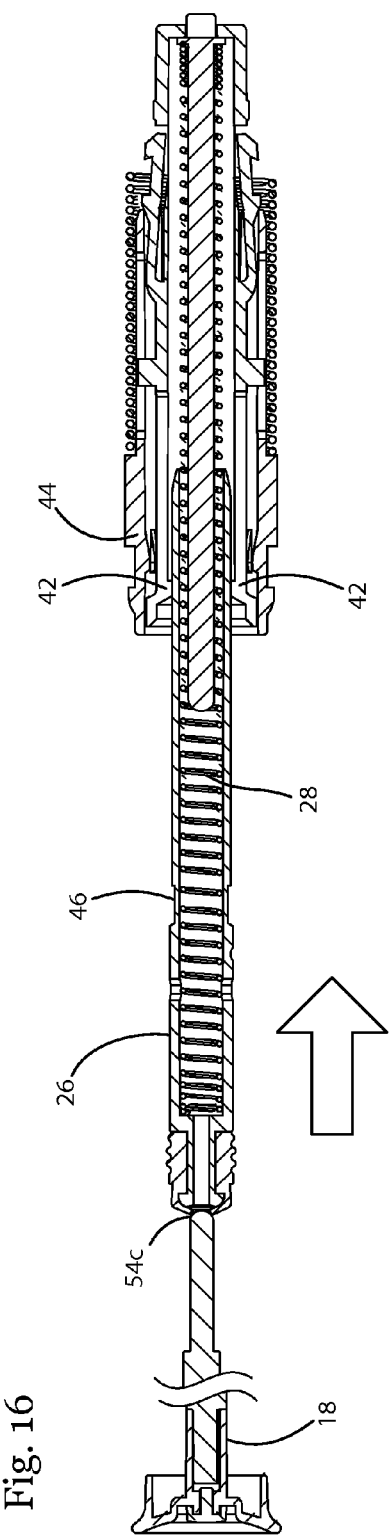
FIG. 16 is a cross sectional view shown in FIG. 15, with the plunger in a partially reset position, showing the cap in contact with the plunger.

FIG. 15 shows the plunger in a post actuation position, wherein the plunger spring 28 is extended, and the prongs 40 are in a relaxed position, locking the actuation member 14 to prevent re-actuation of the device 10 until reset of the device. FIG. 16 shows the cap 18 being moved toward the proximal end of the device 10, exerting a pressure on the distal end of the plunger 26 to reset the plunger 26 from a post actuation position (as in FIG. 15) to a reset position. In FIG. 16, the plunger 26 is shown in mid-reset position and the plunger spring 28 is partially compressed. Between FIG. 15 and FIG. 16, the collar 44 is moved toward the proximal end of the device 10 from a post-actuation position to a reset position, wherein the firing fingers 42 are shown near the end of collar 44 in a reset position in FIG. 17. FIG. 17 shows the plunger 26 in a near-reset position, wherein the firing fingers 42 are interfacing with the plunger groove 46. FIGS. 17-18 show another view of the reset of the collar 44, as it is moved toward the proximal end of the device 10 from FIG. 17 to FIG. 18 during reset of the device 10.

Reset of the collar 44 results in the outer housing 37 sliding relative to the inner housing 38 toward the proximal end of the device 10 such that the upper portion of the outer housing 37 biases the inner housing prongs 40 inward to reset and unlock the actuation member 14. In FIG. 17, the inner housing prongs 40 are in a position preventing the actuation member 14 from actuating the device 10 wherein any movement of the actuation member 14 fails to actuate the device in FIG. 17. In FIG. 18, the inner housing prongs 40 are shown biased inward allowing the unlocked actuation member 14 to actuate the device 10 when the actuation member 14 is moved toward a distal end of the device 10 upon application of a force on the actuation member 14.

Figure 19:
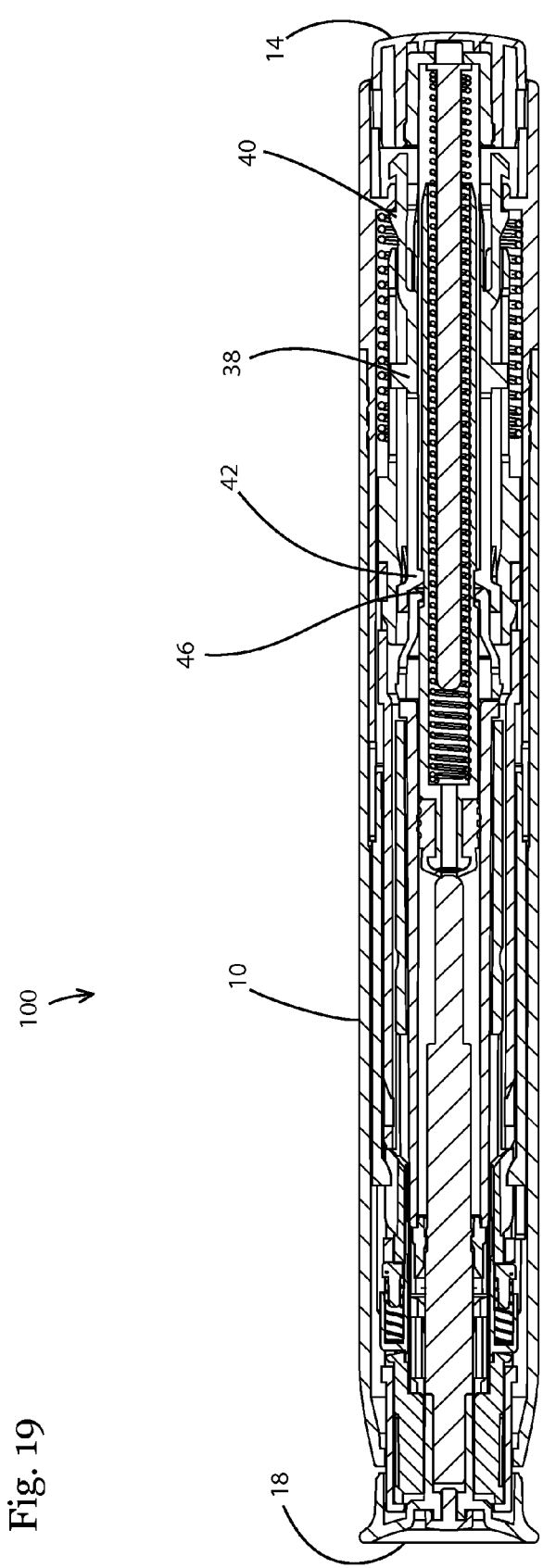
FIG. 19 is a cross sectional view of the embodiment of FIG. 7 with a cap thereon, the device in a fully reset position.

FIG. 19 is a cross sectional view of the embodiment of the device 10 in a fully reset position with the cap 18 on the device 10, the firing fingers 42 within the plunger groove 46, and the actuation member 14 in the locked position, wherein compression of the actuation member 14 fails to activate the device 10, although compression of the actuation member 14 may move the actuation member.

Figure 20:
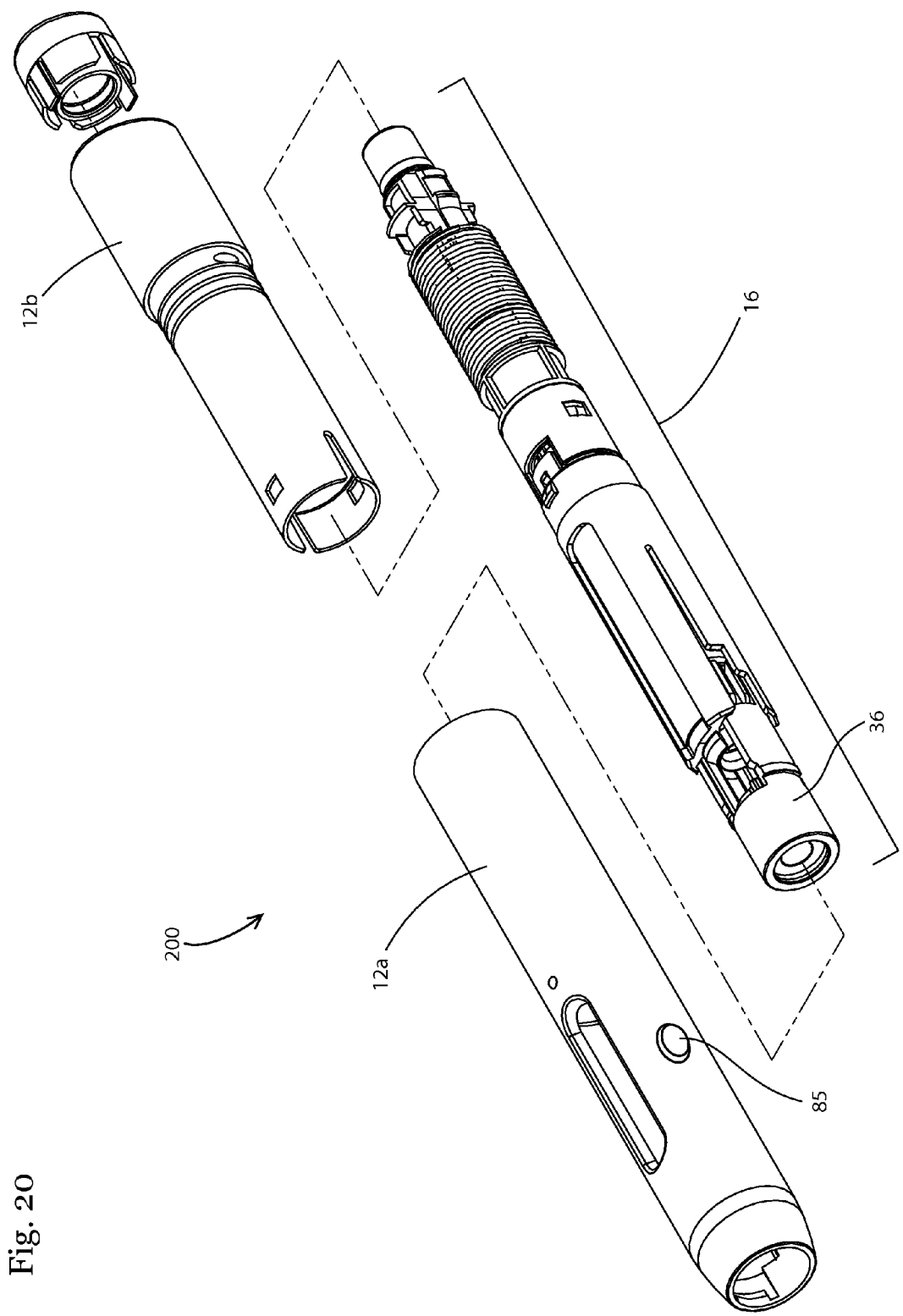
FIG. 20 is an exploded view of another embodiment of the device.

FIG. 20 is an exploded view of another embodiment 200 of the device 80 including an outer shell 12 having an outer upper shell 12*b* and an outer lower shell 12*a* which may be connectable by any of the methods described herein or known to those skilled in the art. The embodiment 200 of the device 80 includes an internal mechanical assembly 16 including a safety shield 36, and further includes a safety shield release member 85, wherein activation of the safety shield release member releases the safety shield 36 from an extended locked position to an unlocked position. The safety shield release member 85 may be provided on an outer surface of the device 80, and may axially and/or circumferentially aligned with the safety lock protrusion and/or safety shield locking tab 51 and may be configured to interact with the safety shield locking tab 51 (shown in the exploded view of the safety shield assembly FIG. 21), in a non-limiting embodiment, on the safety shield 36 to compress the safety shield locking tab 52, biasing it inwardly, to release the safety lock protrusion 59 on the locking sleeve 38 from the locking tab opening 53.

Figure 21:
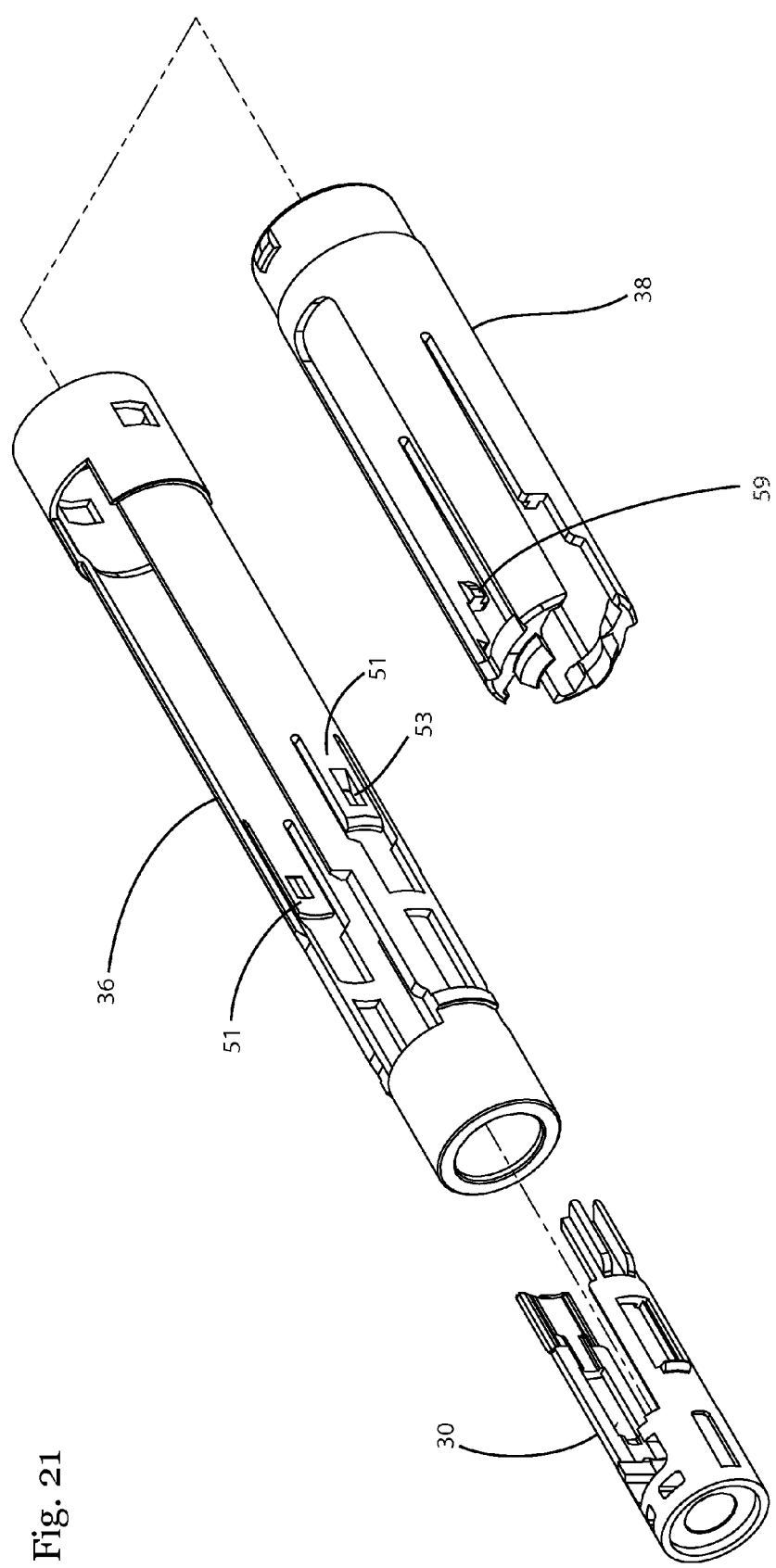
FIG. 21 is an exploded view of the internal reset mechanical assembly of the embodiment of the device of FIG. 20.

In a non-limiting embodiment shown in the exploded view of FIG. 21, the embodiment 200 may further include a reset shuttle 30. The reset shuttle 30 may be used, wherein a cap or other reset tool may be inserted into the device 80 to effect reset of the device 80 by contacting the plunger (not shown), and moving the plunger to a pre-use position, toward the proximal end of the device 80 for a subsequent use.

While one or more embodiments of the present invention have been shown and described herein, such embodiments are provided by way of example only. Variations, changes and substitutions may be made without departing from the invention herein. Accordingly, it is intended that the invention be limited only by the spirit and scope of the appended claims. The teachings of all references cited herein are incorporated in their entirety to the extent not inconsistent with the teachings herein.

What is claimed is:

1. A resettable injection training device, comprising:
an outer shell comprising a proximal end and a distal end, the outer shell defining a chamber there within, an actuation member near a proximal end, and a plunger slidable within the chamber;
a safety shield having an extended locked position, an extended unlocked position and a retracted position;
a locking sleeve configured to interact with the safety shield;
a reset shuttle disposed within the safety shield at a distal end of the device, wherein the reset shuttle is slidable relative to the safety shield, such that movement of the reset shuttle toward the proximal end of the device unlocks the safety shield.

2. The resettable injection training device of claim 1, wherein the safety shield comprises a safety shield locking tab comprising a locking tab opening, and wherein the locking sleeve comprises a safety lock protrusion configured to interface with the locking tab opening when the safety shield is in the extended locked position.

3. The resettable injection training device of claim 2, wherein when the reset shuttle slides relative to the safety shield, the reset shuttle interfaces with the safety shield locking tab to displace the safety lock protrusion from the locking tab opening to unlock the safety shield.

4. The resettable injection training device of claim 3, wherein the reset shuttle comprises a reset tooth, wherein movement of the reset shuttle relative to the safety shield allows said reset tooth to interface with the safety shield locking tab to displace the safety lock protrusion from the locking tab opening to unlock the safety shield.

5. The resettable injection training device of claim 4, wherein the reset tooth comprises a tab interfacing surface at its proximal end, and wherein the safety shield locking tab comprises a tooth interfacing surface, wherein when the reset shuttle slides relative to the safety shield in a proximal direction, the tab interfacing surface interfaces with the tooth interfacing surface, such that the safety shield locking tab is biased toward the chamber, and the protrusion is displaced from the locking tab opening.

6. The resettable injection training device of claim 5, further comprising a cap comprising a cap end and an elongate rod, said elongate rod being receivable within the distal end of the device, wherein movement of the elongate rod into the chamber slides the reset shuttle relative to the safety shield to unlock the safety shield.

7. The resettable injection training device of claim 6, wherein the reset shuttle further comprises at least one sliding block comprising a rod interfacing surface, wherein contact between the elongate rod and the rod interfacing surface of the sliding block slides the reset shuttle in a proximal direction relative to the device.

8. The resettable injection training device of claim 6, wherein the locking sleeve further comprises a sliding block rib comprising a sliding block interfacing surface, and the sliding block comprises a rib interfacing surface, the sliding block rib configured to guide a movement of the sliding block toward the outer shell as the sliding block interfacing surface and the rib interfacing surface interface with one another.

9. The resettable injection training device of claim 8, wherein the interface between the elongate rod and the sliding block moves the sliding block toward the outer shell such that the elongate rod can traverse the sliding block to advance within the chamber toward the proximal end of the device.

10. The resettable injection training device of claim 9, wherein the sliding block further comprises a biasing member configured to bias the sliding block toward the chamber, such that contact between the elongate rod and the sliding block biases the biasing member.

11. The resettable injection training device of claim 9, wherein further insertion of the elongate rod into the chamber allows the rod end portion to contact the plunger to reset the plunger from an extended position to a retracted position.

12. The resettable injection training device of claim 11, wherein the elongate rod further comprises a first diameter and a second diameter, wherein the second diameter is greater than the first diameter.

13. The resettable injection training device of claim 12, wherein the elongate rod further comprises a rod shoulder surface configured to interface with sliding block to unlock the shield.

14. The resettable injection training device of claim 13, wherein the rod shoulder surface is at a transition between the first diameter and the second diameter.

15. The resettable injection training device of claim 14, wherein the first diameter comprises between 0.25-9.9 millimeters (mm).

16. The resettable injection training device of claim 14, wherein the second diameter comprises between 3-10 mm.

17. The resettable injection training device of claim 12, wherein the difference between the first and second diameters is 0.1-4.0 mm.

18. The resettable injection training device of claim 7, wherein the reset shuttle comprises at least one compressible member, wherein the compressible member comprises a biasing member, such that biasing the biasing member compresses the compressible member and releasing the biasing member releases the compressible member.

19. The resettable injection training device of claim 18, wherein sliding of the reset shuttle toward the proximal end of the device compresses the compressible member.

20. The resettable injection training device of claim 1, wherein the device further comprises an actuation assembly outer housing and an actuation assembly inner housing, at least one of said actuation assembly outer and actuation assembly inner housings being slidable relative to the other of the actuation assembly outer and actuation assembly inner housing, the actuation assembly inner housing comprising one or more flexible prongs at a proximal end thereof, wherein the prongs are configured to abut the actuation member to lock the actuation member.

21. The resettable injection training device of claim 20, wherein movement of the safety shield from the extended unlocked position to the retracted position forces the actuation assembly outer housing to slide relative to the actuation assembly inner housing toward the proximal end of the device, causing the prongs to be biased inward, unlocking the actuation member and allowing activation of the actuation member.

22. The resettable injection training device of claim 21, wherein the plunger comprises one or more plunger grooves and a plunger spring, and wherein the actuation assembly inner housing further comprises one or more firing fingers configured to interface with the one or more plunger grooves prior to activation of the actuation member.

23. The resettable injection training device of claim 22, wherein activation of the actuation member moves the plunger toward the distal end of the device to an extended position, extending the plunger spring, and displacing the one or more firing fingers from the one or more plunger grooves.

24. The resettable injection training device of claim 21, further comprising an actuation assembly outer housing spring, wherein movement of the actuation assembly outer housing relative to the actuation assembly inner housing in a proximal direction biases the actuation assembly outer housing spring, and extension of the actuation assembly outer housing spring moves the actuation assembly outer housing in a distal direction relative to the actuation assembly inner housing such that the prongs are released to lock the actuation member.

25. The resettable injection training device of claim 1, further comprising a viewing window in a portion of the outer shell providing a view into the chamber of the device.

26. The resettable injection training device of claim 6, wherein at least a portion of the elongate rod comprises a transparent material.

27. A resettable injection training device, comprising:
a an outer shell comprising a proximal end and a distal end, the outer shell defining a chamber there within, an actuation member near a proximal end, and a plunger slidable within the chamber;
a safety shield having an extended locked position, an extended unlocked position and a retracted position, the safety shield comprising one or more safety shield locking tabs each comprising a locking tab opening;
a locking sleeve comprising one or more safety lock protrusions, each safety lock protrusion being configured to interact with a locking tab opening when the safety shield is in an extended locked position; and
one or more safety shield release members associated with the outer shell, said safety shield release members being circumferentially and axially aligned with the one or more safety lock protrusions, such that activation of the safety shield release member releases the safety lock protrusion from the locking tab opening to unlock the safety shield.

28. The resettable injection training device of claim 27, wherein the device comprises an actuation assembly outer housing and an actuation assembly inner housing, at least one of said actuation assembly outer and actuation assembly inner housings being slidable relative to the other of the actuation assembly outer and actuation assembly inner housing, the actuation assembly inner housing comprising one or more flexible prongs at a proximal end thereof, wherein the prongs are configured to abut the actuation member to lock the actuation member.

29. The resettable injection training device of claim 28, wherein movement of the safety shield from the extended unlocked position to the retracted position forces the actuation assembly outer housing to slide relative to the actuation assembly inner housing toward the proximal end of the device, causing the prongs to be biased inward, unlocking the actuation member and allowing activation of the actuation member.

30. The resettable injection training device of claim 28, further comprising an actuation assembly outer housing spring, wherein movement of the actuation assembly outer housing relative to the actuation assembly inner housing in a proximal direction biases the actuation assembly outer housing spring, and extension of the actuation assembly outer housing spring moves the actuation assembly outer housing in a distal direction relative to the actuation assembly inner housing such that the prongs are released to lock the actuation member.

31. The resettable injection training device of claim 27, further comprising a viewing window in a portion of the outer shell providing a view into the chamber of the device.

* * * * *